(12) United States Patent
Robertson

(10) Patent No.: US 6,697,967 B1
(45) Date of Patent: Feb. 24, 2004

(54) SOFTWARE FOR EXECUTING AUTOMATED TESTS BY SERVER BASED XML

(75) Inventor: Andrew Robertson, Plano, TX (US)

(73) Assignee: Yotta Networks, Plano, TX (US)

(*) Notice: Subject to any disclaimer, the term of this patent is extended or adjusted under 35 U.S.C. 154(b) by 244 days.

(21) Appl. No.: 09/681,827

(22) Filed: Jun. 12, 2001

(51) Int. Cl.[7] .............................................. G06F 11/00
(52) U.S. Cl. ............................ 714/43; 714/4; 714/25; 709/224
(58) Field of Search ........................ 714/43, 38, 25, 714/4, 44, 46; 717/115, 139; 709/224; 398/25, 30, 32

(56) References Cited

U.S. PATENT DOCUMENTS

| | | | |
|---|---|---|---|
| 6,249,886 B1 * | 6/2001 | Kalkunte ..................... | 714/47 |
| 6,269,330 B1 * | 7/2001 | Cidon et al. .................. | 714/43 |
| 6,304,982 B1 * | 10/2001 | Mongan et al. ............... | 714/38 |
| 6,446,120 B1 * | 9/2002 | Dantressangle ............. | 709/224 |
| 6,457,143 B1 * | 9/2002 | Yue ............................. | 714/43 |
| 6,490,690 B1 * | 12/2002 | Gusler et al. ................. | 714/4 |
| 6,510,402 B1 * | 1/2003 | Logan et al. ................ | 702/186 |
| 6,565,609 B1 * | 5/2003 | Sorge et al. ................ | 715/503 |
| 2002/0144187 A1 * | 10/2002 | Morgan et al. .............. | 714/43 |
| 2003/0078678 A1 * | 4/2003 | Maturana et al. ............. | 700/2 |

* cited by examiner

Primary Examiner—Robert Beausoliel
Assistant Examiner—Yolanda L. Wilson
(74) Attorney, Agent, or Firm—Gray Cary Ware & Freidenrich, LLP

(57) ABSTRACT

Server-based systems and methods for performing tests involving system components which use non-standardized command languages. In one embodiment, the system comprises a set of servers and an httpd user interface, all of which communicate with each other in a standardized format, such as XML. A user enters a script through the httpd user interface, which forwards the script through a central server to a connections/test server. The connections/test server is configured to break the script into its components and to transmit them to the appropriate test equipment (test sets and switches.) Servers for each of the of the equipment components include libraries which allow the servers to translate the scripts into commands which are recognized by the equipment. The results generated by the equipment are translated, if necessary, back into the standardized format by the test equipment servers and are forwarded through the central server to the httpd user interface.

28 Claims, 3 Drawing Sheets

SOFTWARE FOR EXECUTING AUTOMATED TESTS BY SERVER BASED XML

BACKGROUND OF INVENTION

1. Field of the Invention

The present invention relates generally to test equipment and more particularly to improved systems and methods for automated testing of equipment such as optical networking components using server-based XML.

2. Description of Related Art

Testing is an integral part of the processes for designing and manufacturing equipment of any sort. In order to improve the efficiency of these processes, testing is often automated. Specialized test equipment, and sometimes specialized test software is developed to enable the automation of the test processes.

One example of an automated test environment relates to high-speed optical network testing. Obviously, network component designs have to be tested to ensure that they have the proper functionality. In the case of high-speed optical network testing, this functionality generally involves the generation of a known pattern of data traffic and transmitting this traffic through the system. The system's performance in response to the generated traffic can then be analyzed.

As indicated above, test systems may employ equipment and/or software which is specially developed for a particular component of the test system. In the field of high-speed optical networks, each component may be designed to respond to a customized set of commands which are presented in a particular format. Each of the components must, of course, be addressed using the particular commands which it recognizes.

In the high-speed optical network environment, testing is typically accomplished using a set of interconnected servers through which a user communicates tasks to the components of the system under test. The servers may include, for example, an httpd interface through which the user provides input in the form of a script, a scripter which is configured to interpret and execute the script and to generate component-specific commands which can be executed by the components of the network, a connections language handler which is configured to set up any connections which must be made prior to the execution of the test set commands, a starter which is configured to monitor the servers and a message handler which is configured to route all of the message traffic and between the different servers. (These servers are in addition to the test set and optical switch which are controlled by the servers.)

One of the problems with these prior art automated testing systems is that there is little, if any, consistency between components. In other words, each component typically has its own set of commands and its own scripting format, so a single test script generally cannot be used to test several different components. When it is desired to run a particular task on a particular component, a shell script has to be written for that task/component combination, and the user interface to the component must be modified as well. If it is desired to modify a test sequence for each of several components, the scripts for each of the components must be separately modified—the modification is not made to a single, common test script.

As a result of the inconsistencies between the commands and scripting formats of the different components, the development of testing solutions is a difficult task. Setting up the test system is a time-consuming process which prevents rapid development of these systems. Further, when it is necessary to modify the testing performed by the system, modifications must be made to the scripts for each of the affected components, as well as the servers which handle these scripts. Consequently, prior art test systems are difficult to maintain.

It would therefore be desirable to provide systems and methods for automated testing which use a consistent format to test a range of components, thereby decreasing the time and effort required to set up, maintain or modify the test system.

SUMMARY OF INVENTION

One or more of the problems outlined above may be solved by the various embodiments of the invention. Broadly speaking, the invention comprises systems and methods for performing tests on a test system, wherein the system components employ non-standardized command languages.

In one embodiment, the system comprises a set of servers and a user interface, all of which communicate with each other in a standardized format. The user interface may comprise an httpd server. The standardized format may, for example, comprise XML. The servers include a connections/test server which is configured to parse scripts which are provided by a user through the user interface. The connections/test server is further configured to forward the parsed scripts, through a central server, to servers corresponding to components of the system under test. The servers corresponding to the components of the test system are configured to translate the parsed scripts into commands in a non-standardized formats corresponding to the respective components of the test system. These commands are then executed by the respective components of the test system, potentially generating results which our sent back to the servers for the corresponding test system components. These servers translate the results into the standardized format and forward them to the user interface.

Another embodiment of the present invention comprises a method. In this method, a user enters a script through the (httpd) user interface. The user interface forwards the script through a central server (a master process server) to a connections/test server. The connections/test server is configured to break the script into its components and to initiate execution of the script. In the initial stages of execution, the connections/test server establishes the appropriate connections between the test equipment by sending individual connection scripts to servers for each of the components of the equipment. These servers include libraries which allow the servers to translate the scripts into commands which are recognized by the equipment itself. After the connections have been established, the connections/test server goes through the remainder of the script and forwards the script commands to the servers for the appropriate components of the equipment. These servers translate the script commands into the local command language and forward them to the corresponding equipment components. The results generated by the equipment are translated, if necessary, back into the standardized format by the test equipment servers and are forwarded through the central server to the httpd user interface.

Numerous other embodiments are also possible.

BRIEF DESCRIPTION OF DRAWINGS

Other objects and advantages of the invention may become apparent upon reading the following detailed description and upon reference to the accompanying drawings.

Figure 1:
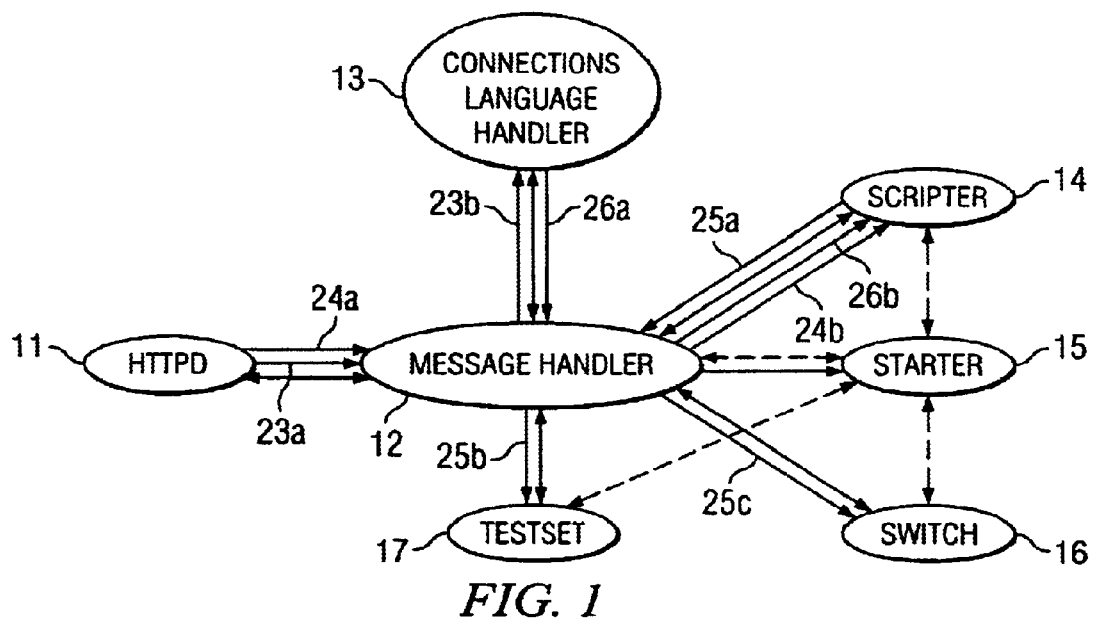
FIG. 1 is a data flow diagram illustrating the interaction between the components of a prior art system.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as defined by the appended claims.

DETAILED DESCRIPTION

A preferred embodiment of the invention is described below. It should be noted that this and any other embodiments described below are exemplary and are intended to be illustrative of the invention rather than limiting.

Broadly speaking, the invention comprises server-based systems and methods for performing tests involving system components which use non-standardized command languages. In one embodiment, the system comprises a set of servers and an httpd user interface, all of which communicate with each other in a standardized format, such as XML. A user enters a script through the httpd user interface. The user interface forwards the script through a central server (a master process server) to a connections/test server. The connections/test server is configured to break the script into its components and to initiate execution of the script. In the initial stages of execution, the connections/test server establishes the appropriate connections between the test equipment by sending individual connection scripts to servers for each of the components of the equipment. These servers include libraries which allow the servers to translate the scripts into commands which are recognized by the equipment itself. After the connections have been established, the connections/test server goes through the remainder of the script and forwards the script commands to the servers for the appropriate components of the equipment. These servers translate the script commands into the local command language and forward them to the corresponding equipment components. The results generated by the equipment are translated, if necessary, back into the standardized format by the test equipment servers and are forwarded through the central server to the httpd user interface.

The various embodiments of the invention provide a convenient means to perform system testing using a unified format for the scripting and test mechanisms. The ease of testing may be improved by overcoming a number of problems, such as having to be familiar with the specialized command languages of each individual equipment component, and having to modify both the equipment component library and central CGI when the components and/or test capabilities of the components change. A user should have to write no low-level code to accomplish the same tasks.

It may aid in understanding of the invention to the first consider the structure and drawbacks of the conventional systems and methods.

Prior art test systems use what may be referred to as a datagram methodology to implement testing of high-speed optical networks. Referring to FIG. 1, a data flow diagram illustrating the interaction between the components of one such prior art system is shown. In this figure, the test system comprises seven components:

httpd user interface 11; message handler 12; connections language handler 13;

scripter 14; starter 15; switch 16; and test set 17.

The flow of data between the components illustrated in FIG. 1 is depicted by the arrows between the components. Because data may flow from one component, through a second component and to a third component, the path of the data may be broken into segments which are indicated by identical numerals, followed by consecutive lowercase letters. For example, the data path from httpd interface 11 to connections language handler 13 is indicated by arrows 23 (segments 23a and 23b.) It should be noted that the data paths which directly connect message handler 12 and starter 15 to the other components of the system are not numbered since they consist of single segments. Descriptions of the types of data which is passed between the components follows.

Starter 15 is configured to start all of the other processes in the system. It is also configured to monitor each of these processes. The data transmitted between starter 15 and the other components is indicated by the dashed arrows.

Message handler 12 is configured to pass messages from a one node to another. These messages are communicated in the form of custom datagram packets. As indicated above, data communicated to and from message handler 12 is indicated by the un-numbered, solid, single-segment lines.

Httpd user interface 11 is configured to pass a connection string to connections language handler 13. This data is passed from user interface 11 to message handler 12, which in turn forwards the message to connections language handler 13. This data path is indicated by reference numerals 23a and 23b. User interface 11 is also configured to transmit a test script to scripter 14. Again, this data is transmitted first to message handler 12, and is then forwarded to scripter 14. This data path is indicated by reference numerals 24a and 24b.

Scripter 14 is configured to pass commands which are generated from the test script to switch 16 and test set 17. The data paths for the transfer of this information are indicated by reference numerals 25a, 25b and 25c. (The path from scripter 14 to switch 16 comprises segments 25a and 25c, while the path from scripter 14 to test set 17 comprises segments 25a and 25b.) The scripter is capable of distributing segments of code to sub-components, re-interpreting it in languages appropriate for the sub-components if necessary. The scripter also executes code specifically intended for the scripter, performing higher level data functions, including much of the logic behind tests, data comparisons and tracking, and data recording.

Connections language handler 13 is configured to interpret a connection portion of the test script and to generate instructions before for scripter 14 to make the appropriate connections. These instructions are transmitted via the path indicated by reference numerals 26a and 26b.

Figure 2:
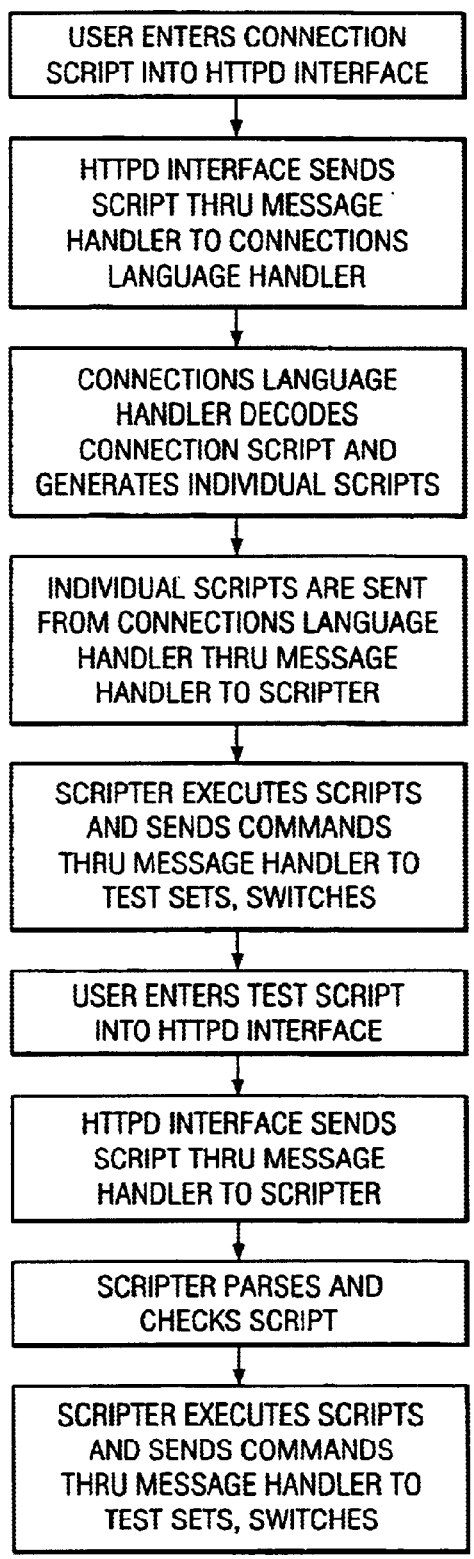
FIG. 2 is a flow diagram illustrating the steps which are taken in a prior art system to implement testing.

Referring to FIG. 2, a flow diagram illustrating the steps which are taken in the prior art system to implement testing are illustrated. As shown in the diagram, the first step is for a user to enter a connection script into the httpd interface. The connection script describes the connection(s) to be made for the subsequent testing. The structure of the connection script may look like the following example.

ingress_endpoint <connection parameters> egress_endpoint

The httpd interface then transmits the script via the message handler to the connections language handler. The connections language handler then decodes the connection description embodied in this connection script and generates appropriate scripts to establish the connection. These scripts may look something like the examples below.

| | |
|---|---|
| testset::set_mode(ingress_endpoint, mode);<br>testset::generator on; | [endpoint_script] |
| switch::connect( ) | [switch_script]<br>[endpoint_script] |
| testset::set_mode(egress_endpoint, mode);<br>testset::generator on; | |

There is one script for each end point test set and one script for the switch connection. The connections language handler then transmits each of the scripts which it has generated via the message handler to the scripter. The scripter executes each of the scripts received from the connections language handler. As each script is executed by the scripter, it generates corresponding commands which it sends to the appropriate test set or switch. These commands are, of course, transmitted via the message handler. The necessary connections are thereby established.

After the connections are established, the user enters a test script into the httpd user interface. The script may look something like the following example.

testset::reset_pm(egress_endpoint);
testset::analyzer_on(egress_endpoint);
sleep(10);
$retval=testset::analyzer_off(egress_endpoint);
return("fail") if ($retval==undef);

This script is sent via the message handler to the scripter. The scripter parses the script and checks it. Again, the scripter generates commands corresponding to the test script for the respective test sets or switches and forwards them via the message handler to the appropriate destination components. The test sets and/or switches receive the commands from the scripter and execute them. The output resulting from the execution of these commands is transmitted via the message handler back to the scripter. The scripter then forwards this information through the message handler to the httpd user interface.

Figure 3:
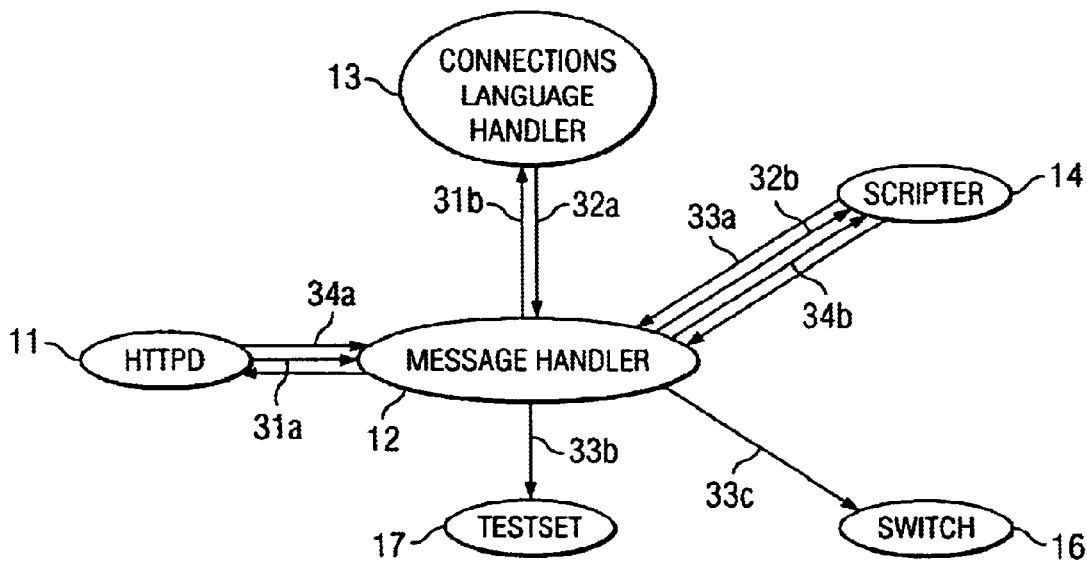
FIG. 3 is a diagram illustrating the flow of data corresponding to the steps of FIG. 2.

Referring to FIG. 3, a diagram illustrating the flow of data corresponding to the steps of FIG. 2 is shown. After the connection script is entered by the user, it is transmitted to the connections language handler as indicated by arrows 31. The connections language handler generates individual connection scripts for the end point test sets and the switch, and transmits these to the scripter as indicated by arrows 32. The scripter executes the individual connections scripts, generating commands which are transmitted to the test set(s) and switch(es) as indicated by arrows 33. This establishes the connection between the switches and end point test sets. The user then enters a test script which is transmitted to the scripter as indicated by arrows 34. The scripter parses and checks the test script, then executes it, sending commands to the test set(s) and switch(es) as indicated by arrows 33. (Because the data path is the same, regardless of whether the commands correspond to connection or test scripts, only a single set of arrows indicated by reference numeral 33 is shown from the scripter to the test sets and switches.) It should be noted that, as the commands are executed by the test set and/or switch, the results are returned to the scripter. The scripter then forwards the test results to the httpd user interface.

Conventional systems typically employ very well formed languages which may describe which nodes are involved in testing, which test sets are used, what the traffic parameters are, what policing is used, which different bits should be set, and so on. The format of the language may be very distinct, or even inconsistent. One of the problems with these well formed languages is that it may take months to write to the original server applications (e.g., a parser) and weeks to make any modifications to them. It is important to be able to accomplish the same functions using a very standard format.

The present systems and methods differ from the prior art in several ways. For example, they are based on a server model, rather than employing the datagram methodology of prior art systems. The present systems and methods are also based on the use of a uniform protocol for most communications. In a preferred embodiment, HTTP is used. (Although the servers communicate in a standardized format, the servers themselves may be written to use any suitable protocol, e.g., SMTP, SNMP, etc.) The use of a common communication format allows the same logic to be used to control the scripting and connection mechanisms. This minimizes the time and expense of setting up, maintaining or modifying a test system.

Figure 4:
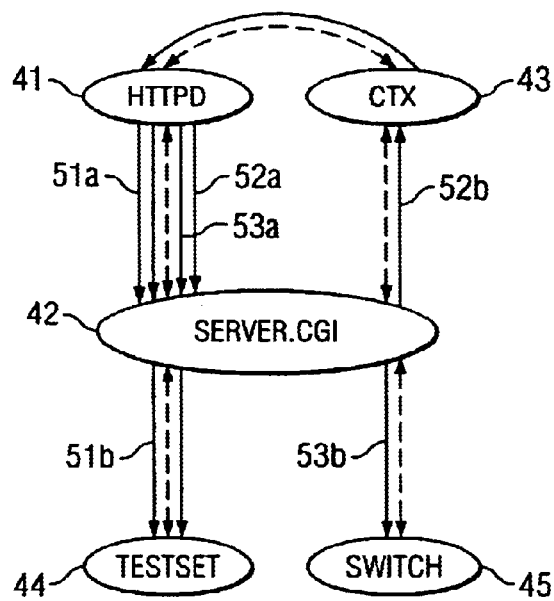
FIG. 4 is a dataflow diagram illustrating the data paths between the components of one embodiment of the present system.

Referring to FIG. 4, a dataflow diagram illustrating the data paths between the components of one embodiment of the present system is shown. It can be seen from this figure that the present system comprises fewer components then the prior art system. The test set and switch components 44 and 45 are the same. (It should be noted that they are the same insofar as they are included in both the present system and the prior art system—they need not be identical components.) Of the other components, only httpd user interface 41 remains. (Again, although this is essentially the same component as in the prior art, the configuration of the components differs from the prior art user interface as required for use with the other components of the present system.) The system also includes master process server 42 and connections/test server 43.

The flow of data between the components is illustrated in FIG. 4 by arrows extending from one component to another. As in the previous figures, segments of the same data path are identified by the same reference numeral, followed by a lowercase letter. Test set 44 is controlled through the httpd user interface. User input is directed through master process server 42 to the test set as indicated by arrows 51. Connection/test server 43 is also controlled by the user through httpd user interface 41. The data transmitted from the user interface to the connections/test server is routed through master process server 42 as indicated by arrows 52. Switch 45 is likewise controlled by the user through httpd user interface 41. User input to switch 45 is directed from httpd user interface 41, through master process server 42, to switch 45. This is indicated by arrows 53. Test set 44 and switch 45 may also be controlled by connection/test server 43. Control data transmitted by connection/test server 43 to either of these components is routed through httpd interface 41 and master process server 42 to the respective components (44 or 45.) The allowable code references between the components are indicated by the dashed lines.

Httpd user interface 41 comprises a Web server and a set of CGIs. This interface enables the user to access any of the equipment interfaces in the system (e.g., the master process server 42, the test set 44, . . . ) More particularly, interface 41 is configured to receive user input in the form of a script which defines the connections to be established and the subsequent tests to be performed. Interface 41 is configured to transmit the script to the connections/test server via the master process server.

A CGI (Common Gateway Interface) or CGI program is a program which is run on a web server and is designed to transfer data (which is potentially dynamic) to or from the web server. The program can be written in any programming language, including C, Perl, Java, Visual Basic or others. CGIs are commonly used to allow web servers to interact dynamically with users.

Master process server 42 comprises a simple CGI which essentially serves as a wrapper around the libraries for the other equipment (e.g., the test set.) Master process server 42 is configured to forward scripts from the httpd user interface to the connections/test server, and to forward/translate commands originating with the connections/test server to the test sets and switches.

Connections/test server 43 comprises a CGI which is configured to parse test scripts, transmit code objects to other servers and execute data operations. Connections/test server 43 receives scripts (having connection and test portions) from the httpd user interface and parses these scripts. It then generates commands for the other servers and transmits the commands, via the user interface and the master process server, to the appropriate servers. Both the original script and the commands generated by the connections/test server are in standardized formats. The commands are translated into the non-standardized syntax of the respective test sets and/or switches by the corresponding libraries.

Test set 44 comprises a library corresponding to the test set equipment. This library controls the equipment and is configured to translate the commands which are received from the connections/test server (via the user interface and master process server) and a standardized format into commands in the non-standardized format of the test equipment.

Switch 45, similar to test set 44, comprises a library corresponding to the switch equipment. This library is configured to translate the standardized connection commands which are received from the connections/test server into the non-standardized commands which are recognized by the switch equipment.

Figure 5:
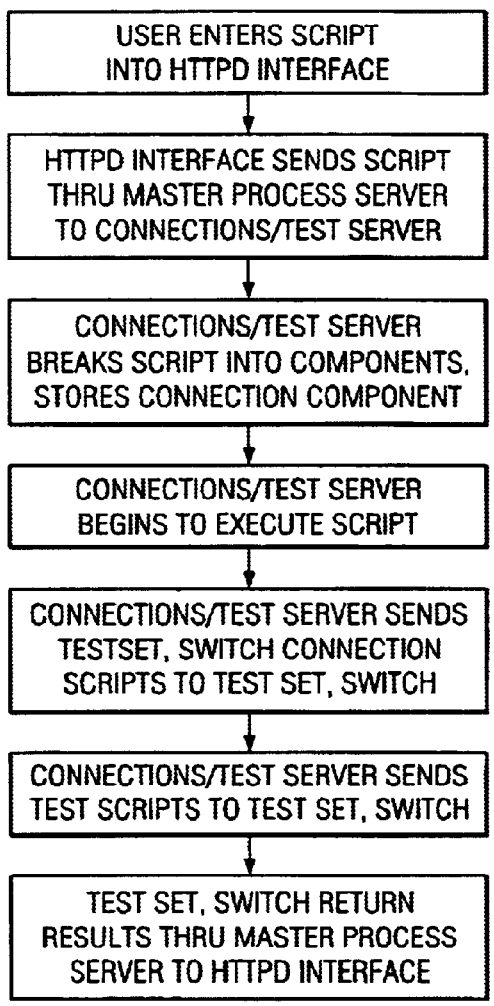
FIG. 5 is a flow diagram illustrating the steps which are taken to implement testing in one embodiment of the present method.

Referring to FIG. 5, a flow diagram illustrating the steps which are taken to implement testing in one embodiment of the present method is shown. (While an XML schema is used in this embodiment, the entities in the schema may take a different form (e.g., '<test_code> . . . </test_code>' or '<xml_test> . . . </xml_test>') in other embodiments.) First, a user enters a script through httpd user interface 41. The general structure of a test script is shown below, where the entire connections/test script is referred to by the label <ctx>. The script includes a connection (<connection>) portion which defines the connection to be made, and a test (<test>) portion which makes the connection and performs the tests.

```
<ctx>
  <connection alias george>
    <adtech port=1 slot=2>
      <ingress><egress>
    </adtech>
  </connection>
```

```
  <test>
    <make_connection george>
    <generator on>
    <wait 10>
    <generator off>
    <compare>
  </test>
```

Httpd user interface 41 transmits the script to connections/test server 43 via master process server 42. Connections/test server 43 parses the script into its component parts. Connections/test server 43 then begins to send out commands according to the test script (the <test> block.) When it reaches the <make_connection> command, connections/test server 43 retrieves the <testset> and <switch> blocks of the <connection> block of the script (which had previously been stored) and sends each part to its respective server (i.e., the <testset> block to test set 44 and the <switch> block to switch 45.) These commands are routed through httpd user interface 41 and master process server 42 to the respective servers. Each of the test set and switch servers (44 and 45) then executes the corresponding commands. This process is repeated for the remainder of the <test> block.

Figure 6:
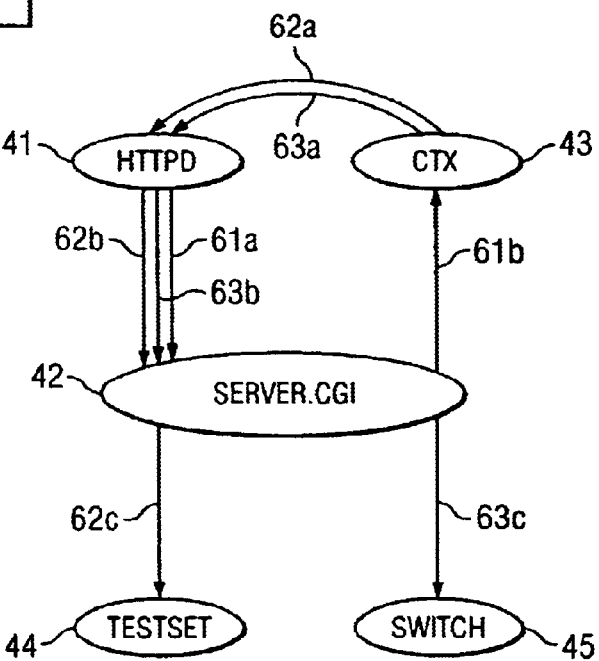
FIG. 6 is a diagram illustrating the flow of data corresponding to the steps of FIG. 5.

Referring to FIG. 6, a diagram illustrating the flow of data corresponding to the steps of FIG. 5 is shown. The test script which is entered into httpd user interface 41 by the user is transmitted through master process server 42 to connections/test server 43 as indicated by arrows 61. After connections/test server 43 parses the script, it transmits the commands of the script to test set 44 and switch 45 via httpd interface 41 and master process server 42. The data path from connections/test server 43 to test set 44 is indicated by arrows 62, while the data path from the connections/test server to switch 45 is indicated by arrows 63. The results of the execution of the commands by test set 44 and switch 45 are returned to httpd user interface 41 via master process server 42 (this data path is not shown in the figure.)

It should be noted that, while a given test configuration may include additional components (e.g., other switches, test sets or devices under test,) only two are shown in FIGS. 4 and 5 for clarity. References to test sets or switches, either singular or plural, should be construed to include one or more of the respective components.

The present systems and methods may provide a number of benefits. For example, when a component of the tested equipment is changed, or when its capabilities change, it is not necessary to rewrite everything from end to end. The present systems and methods play off of the similarities which exist in the test structure and utilize the same test script for different components. Consequently, a change in components or capabilities typically requires a change only to the corresponding test set library.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:

1. A test system employing a server model comprising:
   a user interface;
   one or more servers coupled to the user interface, wherein the one or more servers are configured to communicate with the user interface in a standardized format; and
   a test equipment component coupled to at least one of the one or more servers, wherein the test equipment component is configured to communicate with the at least one of the one or more servers in a non-standardized format specific to the test equipment component;
wherein the one or more servers comprise a connections/test server and a test equipment component server, wherein the user interface is configured to provide scripts to the connections/test server, and wherein the connections/test server is configured to transmit commands in the standardized format to the test equipment component server, and wherein the test equipment component server is configured to generate one or more commands in the non-standardized format to the test equipment component, wherein the non-standardized format is specific to the test equipment component.

2. The system of claim 1 further comprising a switch coupled to at least one of the one or more servers, wherein the switch is configured to communicate with the at least one of the one or more servers in a non-standardized format specific to the switch, wherein the at least one of the one or more servers is configured to forward a second portion of the commands to the switch.

3. The system of claim 2 wherein the first portion of the commands comprises test commands and wherein the second portion of the commands comprises connection commands.

4. The system of claim 2 wherein the one or more servers comprises a plurality of libraries, wherein one of the libraries is configured to enable the conversion of scripts in the standardized format into commands in the non-standardized format specific to the test equipment component, and wherein one of the libraries is configured to enable the conversion of scripts in the standardized format into commands in the non-standardized format specific to the switch.

5. The system of claim 1 wherein the test equipment component is configured to return one or more results, wherein the test equipment component server is configured to translate the results into the standardized format and to forward the translated results to the user interface.

6. A test system employing a server model comprising:
a user interface;
one or more servers coupled to the user interface, wherein the one or more servers are configured to communicate with the user interface in a standardized format; and
a test equipment component coupled to at least one of the one or more servers, wherein the test equipment component is configured to communicate with the at least one of the one or more servers in a non-standardized format specific to the test equipment component;
wherein the one or more servers comprise a connections/test server, wherein the connections/test server is configured to parse the user input into commands and determine a test equipment component corresponding to each command, wherein the connections/test server is configured to forward each command to the corresponding test equipment component.

7. The system of claim 6 wherein the one or more servers further comprise a central server configured to pass communications between the connections/test server and the test equipment components, and wherein the central server is configured to provide a wrapper for the test equipment components.

8. A test system employing a server model comprising:
a user interface;
one or more servers coupled to the user interface, wherein the one or more servers are configured to communicate with the user interface in a standardized format; and
a test equipment component coupled to at least one of the one or more servers, wherein the test equipment component is configured to communicate with the at least one of the one or more servers in a non-standardized format specific to the test equipment component;
wherein one of the one or more servers comprises a library configured to enable the conversion of scripts in the standardized format into commands in the non-standardized format specific to the test equipment component.

9. A test system employing a server model comprising:
a user interface;
one or more servers coupled to the user interface, wherein the one or more servers are configured to communicate with the user interface in a standardized format; and
a test equipment component coupled to at least one of the one or more servers, wherein the test equipment component is configured to communicate with the at least one of the one or more servers in a non-standardized format specific to the test equipment component;
wherein the user interface is configured to accept user input in the form of XML scripts and to forward the XML scripts to the connections/test server.

10. The system of claim 9 wherein the one or more servers are configured to provide a graphical description of a test equipment component connection configuration.

11. The system of claim 10 wherein the graphical description comprises a description formatted in scalable vector graphics (SVG).

12. A test system employing a server model comprising:
an httpd user interface;
one or more servers coupled to the user interface, wherein the one or more servers are configured to communicate with each other in a standardized format; and
a plurality of test equipment components, wherein each of the plurality of test equipment components is coupled to a corresponding one of the one or more servers and configured to communicate with the corresponding server in a component-specific format;
wherein the user interface is configured to provide scripts to the servers corresponding to the test equipment components and wherein each of the servers corresponding to one of the test equipment components is configured to generate one or more commands corresponding to the scripts and to forward the commands to the test equipment component, wherein the commands are in the non-standardized format specific to the corresponding test equipment component.

13. The system of claim 12 further comprising a switch coupled to a corresponding one of the one or more servers, wherein the switch is configured to communicate with the corresponding server in a non-standardized format specific to the switch.

14. The system of claim 13 wherein the one or more servers comprises a plurality of libraries, wherein one of the libraries is configured to enable the conversion of scripts in the standardized format into commands in the non-standardized format specific to the test equipment component, and wherein one of the libraries is configured to enable the conversion of scripts in the standardized format into commands in the non-standardized format specific to the switch.

15. A test system employing a server model comprising:
an httpd user interface;
one or more servers coupled to the user interface, wherein the one or more servers are configured to communicate with each other in a standardized format; and a plurality of test equipment components, wherein each of the plurality of test equipment components is coupled to a corresponding one of the one or more servers and configured to communicate with the corresponding server in a component-specific format;

wherein the one or more servers comprises a library configured to enable the conversion of scripts in the standardized format into commands in the non-standardized format specific to the test equipment component.

16. A test system employing a server model comprising:

an httpd user interface;

one or more servers coupled to the user interface, wherein the one or more servers are configured to communicate with each other in a standardized format; and a plurality of test equipment components, wherein each of the plurality of test equipment components is coupled to a corresponding one of the one or more servers and configured to communicate with the corresponding server in a component-specific format;

wherein the user interface is configured to accept user input in the form of XML scripts and to forward the XML scripts to the connections/test server.

17. The system of claim 16 wherein the one or more servers are configured to provide a graphical description of a test equipment component connection configuration, wherein the graphical description comprises a description formatted in scalable vector graphics (SVG).

18. A method for automated equipment testing comprising:

(a) providing as an input to a test system a test script in a first standardized format (b) parsing the test script into script components;

(c) forwarding each script component to a corresponding component of the test system;

(d) translating each script component into equivalent commands in a non-standardized format of the corresponding component of the test system; and (e) executing each script component in the corresponding component of the test system.

19. The method of claim 18 wherein the standardized format is XML.

20. The method of claim 18 further comprising providing a graphical description of a test set connection configuration.

21. The method of claim 20 wherein the graphical description comprises a description formatted in scalable vector graphics (SVG).

22. The method of claim 18 wherein parsing the test script into script components comprises parsing the test script into one or more connection commands and one or more test commands, wherein the one or more connection commands are forwarded to a switching component and wherein the one or more test commands are forwarded to a test system component; wherein the one or more connection commands are translated into a non-standardized format corresponding to the switching component and wherein the one or more test commands are translated into a non-standardized format corresponding to the test system component.

23. The method of claim 18 further comprising replacing a first test system component having a corresponding first non-standardized format with a second test system component having a corresponding second non-standardized format and, with the same test script, repeating (a) (e).

24. A method for automated equipment testing comprising:

(a) providing as an input to a test system a test script formatted in XML format;

(b) parsing the test script into XML script components;

(c) forwarding each XML script component to a corresponding test system component;

(d) translating each XML script component into equivalent commands in a non-standardized format of the corresponding test system component; and (e) executing each equivalent command in the corresponding test system component.

25. The method of claim 24 further comprising providing a graphical description of a test set connection configuration, wherein the graphical description comprises a description formatted in scalable vector graphics (SVG).

26. The method of claim 24 wherein parsing the test script into script components comprises parsing the test script into one or more connection script components and one or more test script components, wherein the one or more connection script components are forwarded to a switching component and wherein the one or more test script components are forwarded to a test system component; wherein the one or more connection script components are translated into a non-standardized format corresponding to the switching component and wherein the one or more test script components are translated into a non-standardized format corresponding to the test system component.

27. The method of claim 26 further comprising the test system component generating one or more results in the non-standardized format, wherein the one or more results are translated from the non-standardized format into XML and forwarded to a user interface.

28. The method of claim 24 further comprising replacing a first test system component having a corresponding first non-standardized format with a second test system component having a corresponding second non-standardized format and, with the same test script, repeating (a)(e).

* * * * *